United States Patent [19]

Lai et al.

[11] Patent Number: 5,726,733
[45] Date of Patent: Mar. 10, 1998

[54] METHOD FOR INCREASING HYDROPHILICITY OF CONTACT LENSES

[75] Inventors: Yu-Chin Lai; Paul L. Valint, Jr., both of Pittsford, N.Y.

[73] Assignee: Bausch & Lomb Incorporated, Rochester, N.Y.

[21] Appl. No.: 661,803

[22] Filed: Jun. 11, 1996

Related U.S. Application Data

[63] Continuation of Ser. No. 171,547, Dec. 21, 1993, abandoned.

[51] Int. Cl.[6] ............... G02C 7/04; B05D 3/02; B05D 3/06
[52] U.S. Cl. ............... 351/160; 427/2.1; 427/164; 427/493
[58] Field of Search .............. 427/2.1, 558, 557, 427/164, 493; 623/4, 5, 6; 351/160 R, 160 H; 523/107, 108

[56] References Cited

U.S. PATENT DOCUMENTS

| | | | |
|---|---|---|---|
| 3,916,033 | 10/1975 | Merrill | 427/36 |
| 3,937,680 | 2/1976 | de Carle | 264/2.6 |
| 3,959,102 | 5/1976 | Wajs et al. | 264/2.6 |
| 4,168,112 | 9/1979 | Ellis et al. | 351/160 H |
| 4,208,362 | 6/1980 | Deichert et al. | 264/2.7 |
| 4,537,746 | 8/1985 | Ogunbiyi et al. | 422/28 |
| 4,559,059 | 12/1985 | Su | 427/164 |
| 4,569,858 | 2/1986 | Lim et al. | 427/164 |
| 4,620,954 | 11/1986 | Singer et al. | 264/1.4 |
| 4,666,249 | 5/1987 | Bauman et al. | 351/160 H |
| 4,693,939 | 9/1987 | Ofstead | 428/421 |
| 4,729,914 | 3/1988 | Kliment et al. | 428/36 |
| 4,761,436 | 8/1988 | Kohno et al. | 264/1.36 |
| 4,892,402 | 1/1990 | Sawamoto | 351/160 |
| 4,968,532 | 11/1990 | Janssen et al. | 427/164 |
| 4,978,481 | 12/1990 | Janssen et al. | 427/164 |
| 5,079,319 | 1/1992 | Mueller | 526/238.23 |
| 5,080,683 | 1/1992 | Sülc et al. | 623/66 |
| 5,135,297 | 8/1992 | Valint | 351/160 |
| 5,206,298 | 4/1993 | Kawaguchi | 525/283 |
| 5,310,779 | 5/1994 | Lai | 524/588 |
| 5,387,632 | 2/1995 | Lai et al. | 526/279 |
| 5,408,280 | 4/1995 | von der Haegen et al. | 427/212 |
| 5,409,731 | 4/1995 | Nakagawa et al. | 427/2.12 |
| 5,429,838 | 7/1995 | Mansson et al. | 427/2.24 |

FOREIGN PATENT DOCUMENTS

| | | | |
|---|---|---|---|
| 0574352A1 | 12/1993 | European Pat. Off. | C08F 291/18 |
| 92/05695 | 4/1992 | WIPO | A01N 1/02 |
| 92/05696 | 4/1992 | WIPO | A01N 1/02 |

OTHER PUBLICATIONS

Polymer Science, vol. 35, No. 6, 1193, Birmingham AL US, pp. 849–852, XP377549, A.M. Eevtushenko "Graft Polymerization of Acrylic Acid onto Ozonated Silioxane Matrixes", Jun. 1993.

Patent Abstracts of Japan, vol. 107, No. 143 (P-1507) 23 Mar. 1993 & JP.A.04 316 014 (Seiko Epson Corp) 6 Nov. 1992.

Patent Abstracts of Japan, vol. 016, N. 516 (P-1443) 23 Jan. 1992 & JP.A.04 190 320 (Seiko Epson Corp.) 8 Jul. 1992.

Journal of Applied Polymer Science, vol. 29, No. 3, 1984, New York, USA pp. 877–889, Hiroshi Inque "Surface Photographfting of Hydrophilic Vinyl Monomers onto Diethyldithiocarbamated Polydimethylsiloxane"(Mar.).

*Primary Examiner*—Diana Dudash
*Attorney, Agent, or Firm*—John E. Thomas

[57] ABSTRACT

A method for increasing hydrophilicity of a contact lens, so as to improve surface wettability of the lens, comprises contacting a surface of the contact lens with an aqueous solution including a hydrophilic monomer, and heating the solution while in contact with the surface of the contact lens to effect polymerization.

11 Claims, No Drawings

METHOD FOR INCREASING HYDROPHILICITY OF CONTACT LENSES

This is a continuation application Ser. No. 08/171,547 filed on Dec. 21, 1993, now abandoned.

BACKGROUND OF THE INVENTION

The present invention relates to a method of increasing the hydrophilicity of a contact lens so as to improve the wettability of the lens surface.

Various treatment methods have been proposed to increase the hydrophilicity of a contact lens. U.S. Pat. No. U.S. 4,892,402 (Sawamoto et al.) discloses such a treatment which comprises: contacting the contact lens with a treating solution containing a hydrophilic monomer, at least one photosensitizer selected from aromatic ketones or quinones, and a solvent; and thereafter irradiating the contact lens with ultraviolet light. For the solvent, organic solvents, such as alcohols, aliphatic or alicyclic hydrocarbons and ketones, are employed.

Although the Sawamoto patent reports improved surface wettability for hard contact lenses treated by the disclosed method, this method suffers various drawbacks. The use of an organic solvent-based treating solution can deleteriously affect a contact lens. Further, the method is limited to treatments employing photopolymerization.

SUMMARY OF THE INVENTION

The invention provides an improved method of increasing the hydrophilicity of contact lenses.

The method comprises contacting a surface of the contact lens with an aqueous solution including a hydrophilic monomer, and heating the solution while in contact with the surface of the contact lens to effect polymerization.

This method avoids the deleterious effects attributed to an organic solvent-based treatment solution. Additionally, the use of an aqueous treating solution facilitates thermal polymerization, and since this aspect of the invention obviates the need for photopolymerization, various processing steps can be combined and production time can be reduced in comparison with treatment methods involving photopolymerization.

DETAILED DESCRIPTION OF THE INVENTION

The method of this invention involves treatment of a contact lens with a treating medium based on the aqueous solution containing at least one hydrophilic monomer. Suitable hydrophilic monomers include: ethylenically unsaturated carboxylic acids, such as methacrylic acid and acrylic acid; (meth)acrylic substituted alcohols or glycols, such as 2-hydroxyethyl methacrylate, 2-hydroxyethyl acrylate, glyceryl methacrylate, and polyethyleneglycol methacrylate; vinyl lactams, such as N-vinyl-2-pyrrolidone; and acrylamides, such as methacrylamide and N,N-dimethylacrylamide. (As used herein, the term "(meth)" designates optional methyl substitution. Thus, a term such as "(meth)acrylic" denotes both methacrylic and acrylic radicals.)

Preferably, the treating solution may include about 0.1 to about 10 weight percent of the hydrophilic monomers, with about 1 to about 5 weight percent being especially preferred.

The treating solutions are based on aqueous solutions, i.e., solutions containing water as the primary solvent. (As used herein, the term "treating solution" includes treating media wherein components such as the hydrophilic monomer may not be entirely dissolved in the aqueous solvent.) The treating solution can be based on water alone, or the solutions can be based on an aqueous solution such as saline solution, preferably buffered saline solution having a pH of about 7.1 to about 7.4.

As previously mentioned, since the treating solutions employed in the present method avoid the use of an organic solvent, the solutions have significantly less potential to damage contact lenses treated therewith.

Contact lenses are treated by contacting a surface of the contact lens with the aqueous solution including a hydrophilic monomer, and effecting polymerization of the solution while in contact with the surface of the contact lens. Preferably, the contact lens is immersed in the treating solution, although other methods may be used, for example, spraying a surface of the lens with the solution. Subsequently, the solution and lens is subjected to heat to effect polymerization. Preferably, the solution is maintained under an inert atmosphere during polymerization.

One advantage of using thermal polymerization is that the treatment process can be adapted more easily to the lens manufacturing processes. For example, soft hydrogel lenses are generally sterilized and hydrated in water or saline solution at an elevated temperature, and it is possible to combine these processes with the thermal polymerization step. In contrast, the use of ultraviolet light to effect polymerization requires a separate, additional step in the manufacturing process, although, if desired, the solution and lens can be exposed to ultraviolet light to effect photopolymerization in addition to the thermal polymerization.

It will be appreciated that the use of an aqueous treating solution further facilitates incorporating the present method into contact lens manufacturing processes in that it is not necessary to remove from the treated contact lens any residual organic solvent from an organic solvent-based treating solution as in prior methods. Further, the aqueous treating solutions are more suited for thermal polymerization than solutions based on volatile organic solvents since the tendency of such organic solvents to evaporate at elevated temperatures may preclude the use of thermal polymerization.

According to preferred embodiments, the treating solution includes a thermal polymerization initiator. Preferred initiators include t-butylperoctoate, di(sec-butyl) peroxydicarbonate, and 2,5-dimethyl-2,5-di(2-hexanoylperoxy)hexane. The initiator may be included in the solution at about 0.01 to about 5 weight percent, more preferably about 0.1 to about 1 weight percent.

Optionally, the treating solution may further include a crosslinking monomer. The crosslinking monomer is a material having multiple polymerizable functionalities, preferably vinyl functionalities. Representative crosslinking monomers include: divinylbenzene; allyl methacrylate; ethyleneglycol di(meth)acrylate, tetraethyleneglycol di(meth)acrylate, polyethyleneglycol di(meth)acrylate; and vinylcarbonate derivatives of the glycol di(meth)acrylates, i.e., compounds wherein at least one (meth)acrylate radical is replaced with a vinylcarbonate group, such as methacryloxyethyl vinylcarbonate having the formula:

This latter crosslinking monomer is preferred when the hydrophilic monomer in the treating solution contains vinyl functionality other than a (meth)acrylate group, such as N-vinyl-2-pyrrolidone.

The crosslinking monomer facilitates retention of the hydrophilic monomer on the treated contact lens surface. When present, the treating solution may include about 0.01 to about 10 weight percent of the crosslinking monomers, with about 0.1 to about 5 weight percent being especially preferred.

The method may be employed for treating a wide variety of contact lenses. Suitable contact lenses include: "hard" lenses such as rigid gas permeable (RGP) contact lenses, formed of silicone acrylate or fluorosilicone acrylate copolymers; silicone elastomer "soft" contact lenses; and "soft" hydrogel contact lenses which include silicone hydrogel contact lenses.

Silicone-containing lenses represent preferred classes of contact lenses materials for use in the present method. Silicone-containing contact lenses are formed from a copolymer of at least one hydrophilic monomer and a silicone-containing monomer, such as the aforementioned RGP lenses and silicone hydrogel lenses. Since the copolymers from which these lenses are formed include a silicone-containing monomer, which is hydrophobic, the method is especially advantageous for improving the hydrophilicity of these types of contact lenses.

The following examples illustrate various preferred embodiments of the present invention.

EXAMPLE 1

A solution was prepared by adding to phosphate buffered saline (pH 7.3) N-vinyl-2-pyrrolidone (NVP) (0.5 weight %), methacryloxyethyl vinyl carbonate (Hema-VC) (0.005 weight %), and t-butylperoctoate (TBO, a thermal initiator) (0.005 weight %).

Fluorosilicone acrylate disk samples of a rigid, gas permeable (RGP) fluorosilicone acrylate contact lens material (Quantum/, Polymer Technology Corporation, Wilmington, Mass., USA) were immersed in 7 ml of the above solution, and the solutions containing the disks were autoclaved at 121° C. for one hour to effect thermal polymerization. As a control, the fluorosilicone acrylate disks were immersed in buffered saline and autoclaved at 121° C. for one hour.

Contact angle of the surfaces of the treated disks were measured by the sessile drop method. Contact angle measurements for the Control disks ranged from 63° to 67°, whereas contact angle measurements for the disks treated according to the invention ranged from 45° to 47°.

The data demonstrate that the method of this invention significantly improved surface wettability of the hard contact lens materials.

For comparative purposes, it is noted that Comparative Example 5 of U.S. Pat. No. 4,892,402 reported no improvement of hydrophilicity on the surface of hard contact lenses was obtained when thermal polymerization was employed in place of photopolymerization.

EXAMPLE 2

Fluorosilicone acrylate disks, corresponding to those employed in Example 1, were placed in methanol, a preferred organic solvent disclosed in U.S. Pat. No. 4,892,402. The disks initially had a diameter of 12.8 mm and contained blue tint. After 3 hours, the disks had swollen to a diameter of 14.5 mm, and the blue tint was removed from the disks. After 3 days in the methanol, the disks had a diameter of 14.1 mm. The disks were then removed from the methanol, rinsed, and placed under a vacuum at 60° C. overnight to remove methanol. The diameter was then measured as 12.6 mm, and warping of the disks was observed.

Fluorosilicone disk samples soaked in phosphate buffered saline did not exhibit significant swelling, shrinkage or warping, and the tint remained in the disk samples.

The data confirmed that the method disclosed in U.S. Pat. No. 4,892,402 can deleteriously affect contact lenses.

EXAMPLE 3

A treating solution was prepared by adding NVP (1 weight %), Hema-VC (0.01 weight %) and DAROCUR-1173 (tradename for free radical UV initiator, 0.01 weight %) to methanol, a preferred solvent of the aforementioned U.S. Pat. No. 4,892,402. Silicone hydrogel lenses were placed in individual vials filled with 7-ml of the treating solution. All vials were sealed and exposed to ultraviolet light for 3 hours such that the lenses contained therein were exposed to the light. Subsequently, the lenses were boiled in water for four hours and then placed in buffered saline to hydrate the lenses and extract methanol from the lenses.

The treated lenses were evaluated for water content following hydration (36.0%). Water content of untreated lenses (control) was also measured (38.1%). The treatment with a methanol-based solution, employing UV light, resulted in treated lenses having lower water contents. The data further confirmed that the organic solvents disclosed for the method of U.S. Pat. No. 4,892,402 can deleteriously affect contact lenses.

Although certain preferred embodiments have been described, it is understood that the invention is not limited thereto and modifications and variations would be evident to a person of ordinary skill in the art.

We claim:

1. A method for increasing hydrophilicity of a contact lens consisting essentially of:

contacting a surface of the contact lens with an aqueous solution including a hydrophilic monomer and a thermal polymerization initiator; and heating the solution while in contact with the surface of the contact lens to effect polymerization of said hydrophilic monomer.

2. The method of claim 1, wherein the hydrophilic monomer is selected from the group consisting of ethylenically unsaturated carboxylic acids, (meth)acrylic substituted alcohols or glycols, vinyl lactams, and acrylamides.

3. The method of claim 1, wherein the hydrophilic monomer is N-vinylpyrrolidone.

4. The method of claim 1, wherein the aqueous solution includes buffered saline.

5. The method of claim 1, further comprising exposing the solution to ultraviolet light while in contact with the surface of the contact lens.

6. The method of claim 1, wherein the solution further comprises a crosslinking monomer.

7. The method of claim 6, wherein the crosslinking monomer is methacryloxyethyl vinylcarbonate.

8. The method of claim 1, wherein the contact lens is formed of a silicone-containing material.

9. The method of claim 8, wherein the contact lens is formed of a rigid, gas permeable material.

10. The method of claim 8, wherein the contact lens is formed of a silicone hydrogel material.

11. A contact lens treated by the method of claim 1.

* * * * *